United States Patent [19]

Myhre

[11] 4,369,349
[45] Jan. 18, 1983

[54] TRANSDUCER DIAPHRAGM ELEMENTS AND METHODS AND APPARATUS FOR MAKING SAME

[76] Inventor: Kjell E. Myhre, 941 Enterprise Ave., Inglewood, Calif. 90302

[21] Appl. No.: 252,091

[22] Filed: Apr. 8, 1981

Related U.S. Application Data

[60] Division of Ser. No. 71,807, Sep. 4, 1979, Pat. No. 4,291,218, which is a continuation of Ser. No. 752,108, Dec. 20, 1976, abandoned.

[51] Int. Cl.$^3$ .............................................. B23K 15/00
[52] U.S. Cl. ...................... 219/121 ED; 219/121 EM; 219/121 EX; 219/159
[58] Field of Search ................ 219/121 EC, 121 ED, 219/121 EM, 121 EX, 121 LY, 159–160; 269/37, 57

[56] References Cited

U.S. PATENT DOCUMENTS

| | | | |
|---|---|---|---|
| 3,458,683 | 7/1969 | Canonieo et al. | 219/121 ED |
| 3,808,395 | 4/1974 | Bailey et al. | 219/121 ED |

FOREIGN PATENT DOCUMENTS

4731815  6/1969  Japan ........................... 219/121 ED

OTHER PUBLICATIONS

"Metals Handbook", 8th Ed., vol. 6, pp. 523, 536, 537, Electron Beam Welding.

*Primary Examiner*—M. H. Paschall
*Attorney, Agent, or Firm*—Benoit Law Corporation

[57] ABSTRACT

A diaphragm and a first tubular member are combined into a one-piece transducer diaphragm element by electron beam welding. The first tubular member is formed as a first heat sink contacting one major surface of the diaphragm. A second tubular member is provided as a second heat sink in contact with the opposite major surface of the diaphragm. The diaphragm is sandwiched between the first and second tubular members into a composite structure laterally delimited by the peripheries of the diaphragm and the first and second tubular members. Ends of the first and second tubular members and a peripheral portion of the diaphragm are welded with an electron beam into a fillet-type welding joint monolitically unifying the diaphragm and first and second tubular members. Heat is axially removed from the diaphragm through the mentioned first and second heat sinks during the electron beam welding.

4 Claims, 6 Drawing Figures

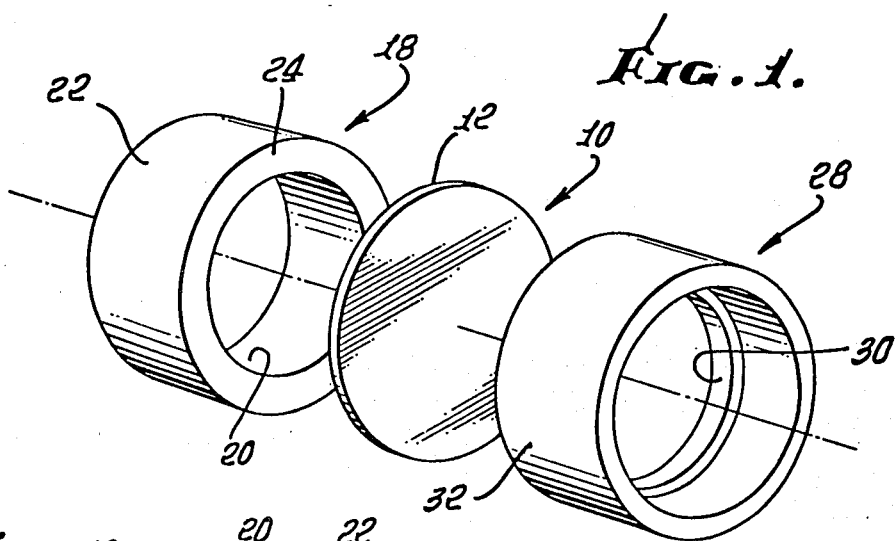
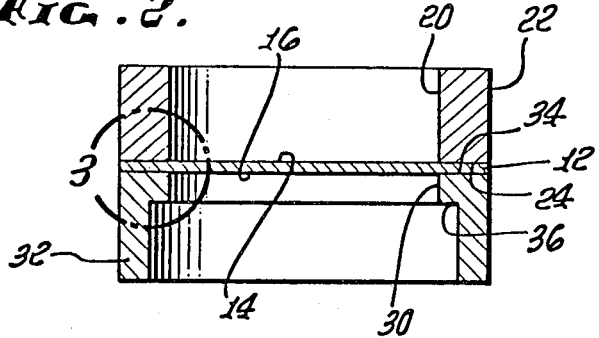
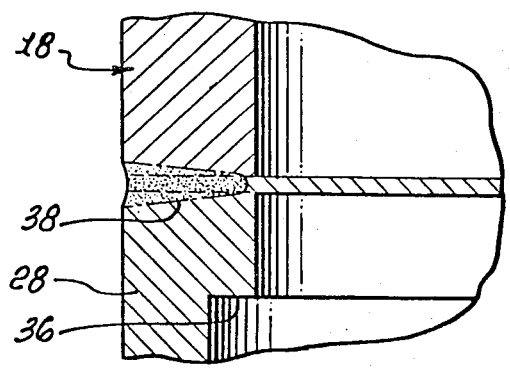
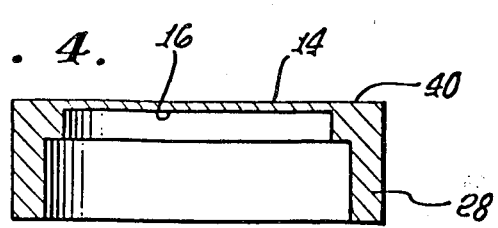
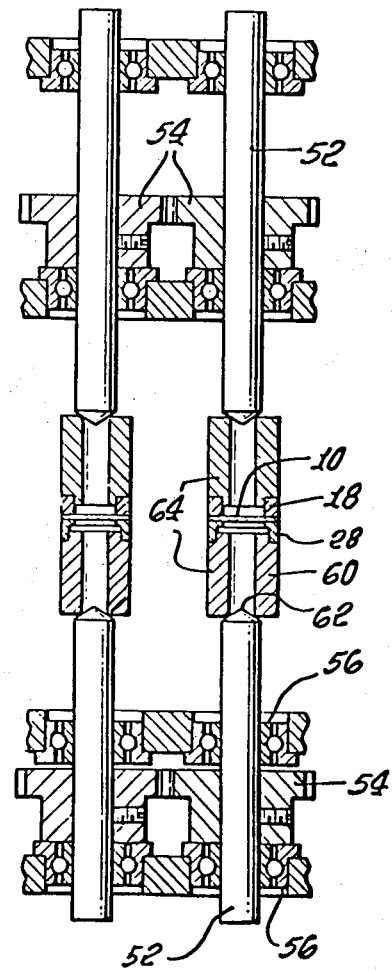

TRANSDUCER DIAPHRAGM ELEMENTS AND METHODS AND APPARATUS FOR MAKING SAME

This is a division of application Ser. No. 06/071,807, U.S. Pat. No. 4,291,218, filed Sept. 4, 1979 as a continuation of application Ser. No. 05/752,108, now abandoned, filed Dec. 20, 1976.

CROSS-REFERENCE

Priority is hereby claimed for the subject patent application under 35 USC 120 from copending patent application Ser. No. 752,108, now abandoned, filed Dec. 20, 1976 by the subject inventor, for Method of Making Diaphragm for Low Pressure Transducers, and herewith incorporated by reference herein, the subject application being a continuation of that copending application.

BACKGROUND OF THE INVENTION

1. Field of the Invention

The subject invention generally relates to transducers and apparatus and methods for making same and, more specifically, to diaphragm elements, edge mounted diaphragms, methods and apparatus for making same, and to the fabrication of very thin metal diaphragms for low-pressure transducers, as well as to such fabricated metal diaphragms and to apparatus and fixtures for fabricating same.

2. Disclosure Statement

This disclosure statement is made pursuant to the duty of disclosure imposed by law and formulated in 37 CFR 1.56(a). No representation is hereby made that information thus disclosed in fact constitutes prior-art inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent.

Difficulties have been encountered in the use of conventional methods of manufacturing thin metal diaphragms for transducers, particularly when the diaphragm itself and the transducing element are intimately joined together such as in a device incorporating a strain gauge bonded to the diaphragm. In such devices, the so-called "machined diaphragm" has had certain advantages provided proper material is used and adequate stress relieving is employed. However, such conventional machined diaphragms have been costly to produce and require excessive or exorbitant quality control monitoring to avoid improper machining of the diaphragm surface.

The use of welding techniques has been limited primarily to seam welding which is satisfactory when the diaphragm serves as a force collector only, with a mechanical link to the transducing element.

Transducer diaphragm electron beam welding has been described in the book ELECTRON-BEAM WELDING: PRINCIPLES AND PRACTICE, by A. H. Meleka (McGraw-Hill, 1971). In particular, that book on pages 272 and 273 shows a pressure transducer having a thin diaphragm electron beam welded to the end of a transducer tube. The diaphragm in that pressure transducer had a diameter smaller than the adjacent end of the tube to enable an axially impinging electron beam to provide a circumferential weld in the diaphragm and a corresponding circular portion of the transducer tube.

To this end, the diaphragm first had to be secured to the transducer tube by means of light weld tacks, produced with a miniature resistance welder. The electron beam weld was carried out by rotating the transducer below the electron beam.

One disadvantage in terms of time, labor, quality, equipment and cost expenditure of that prior proposal stems from the need of having to employ resistance welding, that is a welding technique other than electron beam welding, for initially assembling the diaphragm with the transducer tube. Another inherent disadvantage stems from the fact that the circumferential welding technique disclosed in the cited book in practice leaves an unwelded circular region between the diaphragm and the inner circumferential portion of the transducer tube, as may be seen from FIG. 7.46(b) of the cited book. This renders the diaphragm characteristics non-linear at the cross-over region from negative to positive pressures, inasmuch as the effective diaphragm diameter varies somewhat abruptly as the diaphragm is alternately urged away from and pressed onto the transducer tube.

Also, the technique under consideration produces a rather coarse weld, as may be seen from FIG. 7.46(c) of the cited book.

With conventional electron beam welding techniques, attempts at deep welding penetration frequently foundered on resulting evaporation. As shown, for instance, in FIG. 3.4 of the cited book, mere melting of a metal by the electron beam does not produce deep penetration (see pp. 82 to 85).

On the other hand, deep penetration tends to be accompanied by evaporation of the material impacted by the electron beam, as illustrated by FIGS. 3.4(c) and 3.5, pp. 85 to 89, of the cited book.

Reference may in this respect also be had to Japanese Patent Publication 47-31815 by Matsushita Denki Sangyo Kabushiki-Gaisha (inventor Uno Yoshihiro), published Aug. 16, 1972.

In particular, as that Japanese patent publication shows with the aid of FIGS. 1(a) to (d), conventional electron beam welding tends to proceed through different states, culminating in the formation of a hole or indentation of constant shape, which remains open because of an equilibrium condition as explained in the cited Japanese patent publication and the above mentioned book.

The Japanese patent publication thus rejects attempts to weld thin films to thicker metal sheets by an axially impinging electron beam. Rather, the Japanese patent publication proposes that grooves of V-shaped cross-section be cut into the thicker metal sheet adjacent the applied thin film, in order to diminish thermal capacity and conductivity of the metal sheet or, in other words, diminish the difference between thermal capacity and conductivity between the metal sheet and thin film at the welding sites, providing edged zones in the metal sheet at the thin film of a thickness more comparable to that of the thin film.

In the case of most transducers, it would, however, not be practical or feasible to cut deep grooves into the transducer tube or body in the vicinity of the diaphragm. Also, though the Japanese patent publication shows the cutting of rather deep grooves for edge zone equilization purposes, it appears that the actual electron beam weld is, nevertheless, rather shallow at the periphery of the thin film and thicker metal sheet, without much radial penetration.

The proposal according to the Japanese patent publication also requires the use of force-applying loads for holding the thin metal film in completely tight contact with the underlying metal sheet. In particular, this Japanese reference requires these force-applying loads to leave free edge portions at the film margins of about 0.1 to 2 mm for the electron beam welding process.

In brief, the proposal according to the Japanese patent publication would not be suitable for most transducer applications, which would at any rate require a closed annular weld and, therefore, also an annular V-shaped groove, if implementation of that proposal were to be attempted.

Reference may in this respect also be had to U.S. Pat. No. 3,458,683, by D. A. Canonico et al, issued July 29, 1969. In the context of electron beam welding of a thin metal foil in a sandwich-type arrangement, Canonico et al expressly deprecate the use of electron beam welding methods which involve overlapping or butting of the parts followed by directing a suitable electron beam through the metals or along the formed joint to form the weldment, as otherwise satisfactory in the welding of many metallic materials.

In contrast to the utilization of such techniques, which Canonico et al advise against, they propose to employ an axially extending electron beam which is passed through an annular retaining member and two junctures between the retaining member and a retained foil and between that retained foil and a work piece.

Canonico et al thus obtain a welding fillet which extends through the retaining member and retained foil into the underlying work piece, while also extending somewhat irregularly about an aperture in the annular retaining member.

The axial electron beam welding technique proposed by Canonico et al inevitably leaves unwelded annular regions between the work piece and the foil and between the foil and the retaining member. If attempts were made to apply the proposal of Canonico et al to the manufacture of transducers, essentially the same drawbacks in terms of non-linearity of cross-over characteristics would be encountered, as mentioned above, with respect to the pressure transducer welding technique shown on pages 272 to 273 of the cited ELECTRON-BEAM WELDING book. As can also be seen from page 182 of that book, even the relatively lower shrinkage distortion of electron beam welding would tend to bow or otherwise distort the retained thin film or diaphragm intersected perpendicularly by the welding fillet.

As may further be noted from pages 282 et seq. of the cited book, conventional electron beam welding techniques require the provision and utilization of rather complex and expensive jigs and fixtures which equal and even surpass complex fixtures of the type disclosed in U.S. Pat. No. 4,034,182, by Schlosser et al, issued July 5, 1977.

That existing jigs and fixtures for electron beam welding offer no practical solution for the manufacture of edge mounted transducer elements may further be seen from U.S. Pat. No. 3,780,412, by B. J. Millard, issued Dec. 25, 1973. In particular, Millard proposes the use of rods passing through assembled cylindrical parts and undisclosed "suitable clamping means" for holding the assembled parts together.

The lack of helpful teaching in the state of the art may also be seen from U.S. Pat. Nos. 1,548,106, 1,589,962, 3,624,342, 3,856,995, 3,991,321 and 4,029,911, which propose various clamping, ultrasonic and screw fastener techniques unsuitable for miniature transducers and similar equipment.

For completeness' sake, reference is also made to U.S. Pat. No. 3,816,698, by Wellendorf et al, issued June 11, 1974, and disclosing an arrangement for producing screened printing forms with the aid of an electron beam. While that patent has been cited as of interest in the parent application, it does not evince any particular pertinency.

SUMMARY OF THE INVENTION

It is a general object of the subject invention to overcome the disadvantages and to meet the needs expressed or implicit in the above disclosure statement or in other parts hereof.

It is a germane object of this invention to provide improved methods and apparatus for making transducers, and improved transducers made thereby.

It is a related object of this invention to provide improved methods and apparatus for making edge mounted transducer diaphragms, and improved diaphragms made thereby.

It is a related object of this invention to provide improved electron beam welding methods and apparatus, and improved electron beam welded products.

It is also an object of this invention to provide the advantages of machined diaphragms by employing different methods and apparatus for completing the diaphragm component or unit.

It is a related object of this invention to provide a virtual machined diaphragm without actually having to machine the diaphragm element itself out of a piece of material.

A further object of this invention is to facilitate the fabrication of very thin metal diaphragms for a diaphragm-type low-pressure transducer with a substantial advantage in cost reduction, ease of manufacture and increase in quality.

From one aspect thereof, the subject invention provides diaphragms fabricated from sheet stock of a desired metal and thickness, and then sandwiches the diaphragm element between two cylindrical spacers or tubular heat sink members which are attachable to the periphery of the diaphragm, leaving its central portion free and accessible.

From another aspect thereof, the subject invention provides two spacer elements or heat sink element which have been sized to have substantially the same outer diameter as a diaphragm, such that placing the diaphragm between the two spacers or heat sink members forms an external junction around the periphery, with an elecronic welding beam being emitted in the direction of the junction.

From a related aspect thereof, the subject invention provides methods and apparatus for rotating an external junction of two tubular spacer elements or heat sink members and a diaphragm sandwiched therebetween, past an electron beam to allow the beam to penetrate in a radial direction to the inside diameter of the tubular spacers or members to form a small fillet on each side of the diaphragm.

From another aspect thereof, the subject invention provides methods and apparatus for attaching a diaphragm plate between two spacers or heat sink members by the use of an electron welding beam, without excessively heating or otherwise damaging the diaphragm including the central portion thereof.

From another aspect thereof, the subject invention provides a transducer diaphragm element having desired characteristics by removing one of the above mentioned spacers or tubular members after completion of the electron beam welding to form a forward boundary substantially flush with the adjoining face of the diaphragm.

From another aspect thereof, the subject invention resides in a method of making a transducer and, more specifically, resides in the improvement of combining a diaphragm and a first tubular member into a one-piece transducer diaphragm element by electron beam welding, comprising a combination the steps of forming said first tubular member as a first heat sink having a first end coinciding with a first peripheral region on one major surface of said diaphragm and having a wall thickness for conducting heat away from said first peripheral region axially along said first tubular member, providing a second tubular member as a second heat sink having a second end congruent to said first end, coinciding with a second peripheral region on the opposite major surface of said diaphragm and having a wall thickness for conducting heat away from said second peripheral region axially along said second tubular member, sandwiching said diaphragm between said first and second ends of said first and second tubular members into a composite structure laterally delimited by the peripheries of said diaphragm and said first and second tubular members, welding said first and second tubular members and a peripheral portion of said diaphragm between said first and second ends with an electron beam into a fillet-type welding joint monolithically unifying said diaphragm and first and second tubular members, by directing said electron beam radially inward onto and circumferentially along the junction between said sandwiched diaphragm and first and second tubular members, axially removing heat from said diaphragm through said first and second heat sinks during said electron beam welding and removing the second tubular member after completion of the electron beam welding.

From another aspect thereof, the subject invention resides in an edge mounted transducer diaphragm produced by a method of combining a diaphragm and a first tubular member into a one-piece transducer diaphragm element by electron beam welding and by utilization of the combination of steps recited in the preceding paragraph.

From another aspect thereof, the subject invention resides in apparatus for making edge mounted diaphragm elements by electron beam welding, each diaphragm element including a diaphragm and a heat-conducting first tubular member. The invention according to this aspect resides in the improvement comprising, in combination, a fixture including aligned shafts for retaining said first tubular member in heat-transfer relationship with a first peripheral region on one major surface of said diaphragm and for retaining a heat-conducting second tubular member in heat-transfer relationship with a second peripheral region on the opposite major surface of said diaphragm, and means for rotating said diaphragm and retained first and second tubular members in mutual heat-transfer relationship relative to an electron beam, including means coupled to said shafts for simultaneously driving said shafts.

From another aspect thereof, the subject invention resides in apparatus for making edge mounted diaphragm elements by electron beam welding, each diaphragm element including a diaphragm and a heat-conducting first tubular member. The invention according to this aspect resides in the improvement comprising, in combination, an elongate frame, a fixture including a plurality of pairs of aligned shafts rotatably mounted on said frame for retaining between any pair of aligned shafts a said first tubular member in heat-transfer relationship with a first peripheral region on one major surface of a said diaphragm and for retaining between the particular pair of aligned shafts a heat-conducting second tubular member in heat-transfer relationship with a second peripheral region on the opposite major surface of the particular diaphragm, and means for rotating said diaphragm and retained first and second tubular members in mutual heat-transfer relationship relative to an electron beam, including means coupled to said pairs of shafts for simultaneously driving the shafts of each pair of shafts.

Other aspects, objects, purposes, features and advantages of the subject invention will be evident to those skilled in the art from the following description of exemplary embodiments of the invention.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which:

FIG. 1 is an exploded perspective view of a composite diaphragm structure in accordance with a preferred embodiment of the invention;

FIG. 2 is a sectional view of the diaphragm structure according to a preferred embodiment of the invention;

FIG. 3 is a magnified view taken as indicated by the phantom circle in FIG. 2, and showing the electron beam welding junction according to a preferred embodiment of the subject invention;

FIG. 4 is a sectional view of the diaphragm structure after one of the spacers or tubular heat sinks has been machined off substantially flush with the diaphragm member, according to another preferred embodiment of the subject invention;

FIG. 6 is an enlarged section of a portion of the apparatus and fixture of FIG. 5.

DESCRIPTION OF PREFERRED EMBODIMENTS

Figure 5:
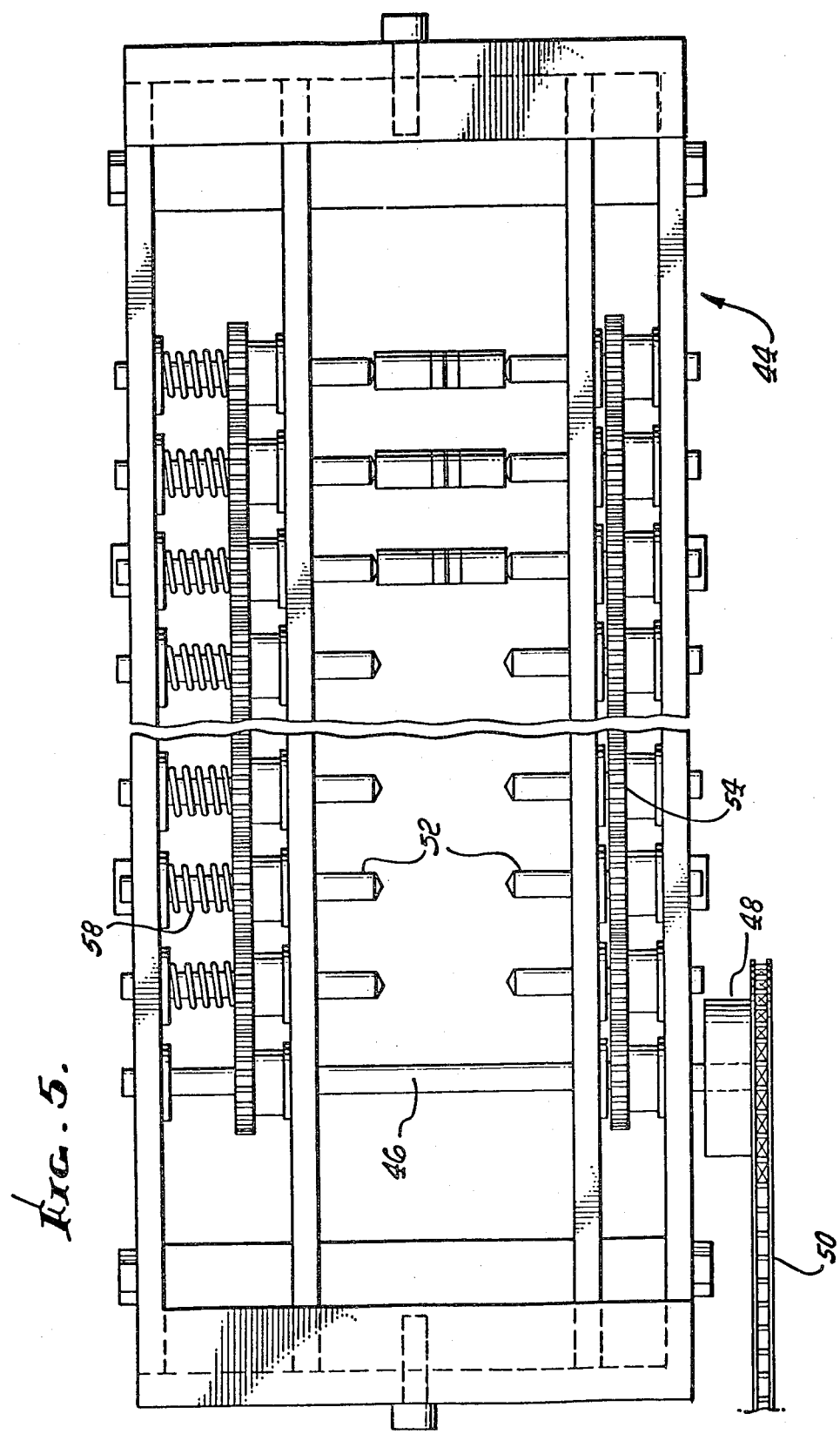
FIG. 5 is a view of an apparatus and fixture according to a preferred embodiment of the subject invention for electronically welding a plurality of diaphragms between their respective spacers or heat sink members.

A transducer diaphragm embodying the invention is formed from three elements, as best shown in FIG. 1. A diaphragm element 10 has an outer edge 12, a forward face 14 disposed toward a pressure chamber (not shown), and a rearward face 16 for mounting strain gage sensors thereon. A front cylindrical spacer or first tubular member 18 has an interior wall 20 and an outer surface 22 which both terminate at an end 24. A back cylindrical spacer or second tubular member 28 similarly has an interior wall 30 and an outer surface 32 which meet to form an end 34 for abutting the diaphragm element 10 around its periphery. In the illustrated form, the interior wall of the back spacer or second tubular member 28 is radially offset to define a ledge 36 which facilitates the attachment of certain of the strain gage components.

Referring to FIG. 2, the diaphragm element 10 is permanently sandwiched between the front and back spacers or first and second tubular members 18 and 28 by an electronically welded junction formed adjacent the peripheral outer edge 12 of the diaphragm element. As illustrated in FIG. 3, by directing an electron beam radially inward along the junction, it is possible to form a fillet-type of welding joint 38 which extends inwardly almost the full thickness of the ends 24, 34 of the spacers. This type of welding joint leaves intact and unimpaired the sensing portion of the diaphragm element which communicates in both directions past and between the interior walls 20 and 30 of the spacers or first and second tubular members 18 and 28.

The spacers or first and second tubular members 18 and 28 are formed thick enough and have sufficient longitudinal dimension to act as first and second heat sinks, drawing away and dissipating the excessive heat resulting from and generated during the welding operation, thus preventing any thermal damage or alteration of the sensing portion of the diaphragm element 10. On the other hand, in the illustrated form of the preferred embodiment, the wall thickness is limited to be approximately ⅛ the diameter of the diaphragm element 10, thereby leaving sufficient diaphragm plate surface for monitoring its tension and compressive reaction to the pressure exerted on its rearward face.

By way of recapitulation and as seen in the drawings, the tubular member 28 is formed as a first heat sink having a first end or outer surface 34 coinciding with a first peripheral region on one major surface of the diaphragm 10 and having a wall thickness for conducting heat away from the first peripheral region axially along the tubular member 28. Similarly, the tubular member 18 is provided as a second heat sink having a second end or outer surface 24 congruent to or with the first end 34. The second end 24 is coinciding with a second peripheral region on the major surface of the diaphragm opposite the above mentioned major surface. The tubular member 18 has a wall thickness for conducting heat away from the mentioned second peripheral region axially along that tubular member 18.

The diaphragm 10 is sandwiched between the ends 24 and 34 into a composite structure laterally delimited by the peripheries of the diaphragm 10 and tubular member 18 and 28.

The ends 24 and 34 of the tubular members 18 and 28 and a peripheral portion of the diaphragm 10 at edge 12 between the ends 24 and 34 are welded with an electron beam into a fillet-type welding joint 38 monolithically unifying the diaphragm and tubular members 18 and 28, by directing the electron beam radially inward onto and circumferentially along the junction between the sandwiched diaphragm 10 and tubular members 18 and 28. By way of example, reference may be had to the above mentioned U.S. Pat. No. 3,780,412, herewith incorporated by reference herein, for an illustration of a welding electron beam directed radially inwardly and circumferentially along a peripheral junction.

Damage to the diaphragm and other drawbacks mentioned above in conjunction with the cited book on ELECTRON-BEAM WELDING and the cited Japanese patent publication are advantageously avoided according to the subject invention by axially removing heat from the diaphragm 10 through the heat sinks 18 and 28 during the electron beam welding.

It will thus be appreciated by those skilled in the art that the equivalent of an actual machined diaphragm can be obtained without having to go through the difficult prior art machining operation directly on the diaphragm.

As shown in FIG. 4, the equivalent of a typical form of finished diaphragm element can be obtained in the present invention by removing the front spacer or tubular member 18 after completion of the electron beam welding to form a forward boundary 40 which is substantially flush with the forward face of the diaphragm element 10 or with the major surface of the diaphragm opposite the above mentioned one surface at the member 28. More specifically, the diaphragm element remains mounted on and joined to the back spacer or tubular member 28 through an electron welded junction 38 by machining off the front spacer or tubular member 18 itself after the welding steps or electron beam welding have been completed. Thus the beneficial results of a typical diaphragm configuration which was previously obtained by a direct machining process can now be realized through quality control of numerous diaphragm plates in a single sheet of metal rather than stringent monitoring of a customized machining of the diaphragm plates individually.

In order to achieve efficient and precise electronic welding along the peripheral junction of the diaphragm plate and its adjacent spacers, a fixture as shown in FIGS. 5 and 6 has been developed for mounting and rotating the composite three-element unit 10, 18, 28 past and relative to an electron welding beam directed in a given direction. More particularly, an elongate frame 44 journals a drive shaft 46 which carries on one end a sprocket wheel 48 engaged and moved by a chain 50.

A plurality of driven shafts 52 are rotatably mounted in pairs of opposing aligned shafts on the frame. Each shaft 52 carries one of a cascade of interconnecting spur gears 54. The use of suitable bearings such as the flanged bearings 56 located at four support points for each shaft assures reliable controlled rotation of the shafts 46, 52. The removable mounting itself is accomplished by placing tapered forward ends 62 of the shafts 52 which are biased inwardly by springs 58 into an open end of two mounting rods 60. The springs 58 are coupled to one of the aligned shafts 52 in each pair of biasing that one shaft toward the other shaft of the particular pair. The other ends 64 of the rods are sized and shaped to engage the spacer members without touching directly the diaphragm plate.

The illustrated fixture 44 thus includes for each pair of aligned shafts 52 a first connecting rod 64 for coupling one of the aligned shafts of the particular pair to the tubular member 18, and a second connecting rod 64 for coupling the other aligned shaft of the particular pair to the other tubular member 28. Preferably one of the first connecting rod 64 and tubular member 18 has a tapered end 62 insertable into a matching recess 20 of the other of these first connecting rod and tubular member 18. Similarly, one of the second connecting rod 64 and tubular member 28 has a tapered end insertably into a matching recess of the other of these second connecting rod and tubular member 28.

In operation, a plurality of composite units to be welded are mounted by the aforementioned spring force or the like on the shafts for simultaneous rotation at a desired speed. The alignment of the opposing shafts assures similar co-axial alignment of the rods 60 and the spacers carried therebetween. By making the diaphragm elements 10 and the spacers 18, 28 with the same outside diameters, the composite diaphragm element can be manually or otherwise maneuvered to position the edges 12 coincident with the other surfaces 22, 32 when the spring locks them into welding position between the shafts 52. Thus by driving the chain at a convenient speed, a plurality of composite three-element units can be welded simultaneously or sequentially by an electron welding beam directed radially inwardly along the aforementioned peripheral junction of the unit.

In particular, and as seen in the drawings, the opposed aligned shafts in any pair retain a tubular member 18 in heat-transfer relationship at 24 with a peripheral region on one major surface of the diaphragm and further retain between the particular pair of aligned shafts a heat-conducting tubular member 28 in heat-transfer relationship with a second peripheral region on the opposite major surface of the diaphragm 10.

Equipment for rotating the diaphragm 10 and retained tubular members 18 and 28 in mutual heat-transfer relationship relative to an electron beam include the drive 46, 48 and 50 coupled to the pairs of shafts 52 by spur gears 54 for simultaneously driving the shafts of each pair of shafts 52.

In accordance with the illustrated preferred embodiment, the drive shaft 46 and spur gears 54 gang together the shafts in each pair of shafts 52. Preferably, the illustrated plurality of pairs of shafts are so ganged together.

Although an exemplary emodiment of the invention has been disclosed and discussed, it will be understood that other applications of the invention are possible and that the embodiment may be subjected to various changes, modifications, and substitutions without necessarily departing from the invention.

I claim:

1. In a method of making a transducer, the improvement of combining a diaphragm and a first tubular member into a one-piece transducer diaphragm element by electron beam welding, comprising in combination the steps of:

forming said first tubular member as a first heat sink having a first end coinciding with a first peripheral region on one major surface of said diaphragm and having a wall thickness for conducting heat away from said first peripheral region axially along said first tubular member;

providing a second tubular member as a second heat sink having a second end congruent to said first end, coinciding with a second peripheral region on the opposite major surface of said diaphragm and having a wall thickness for conducting heat away from said second peripheral region axially along said second tubular member;

sandwiching said diaphragm between said first and second ends of said first and second tubular members into a composite structure laterally delimited by the peripheries of said diaphragm and said first and second tubular members;

welding said first and second ends of said first and second tubular members and a peripheral portion of said diaphragm between said first and second ends with an electron beam into a fillet-type welding joint monolithically unifying said diaphragm and first and second tubular members, by directing said electron beam radially inward onto and circumferentially along the junction between said sandwiched diaphragm and first and second tubular members;

axially removing heat from said diaphragm through said first and second heat sinks during said electron beam welding; and removing said second tubular member after completion of said electron beam welding.

2. A method as claimed in claim 1, wherein:

said second tubular member is removed after completion of said electron beam welding so as to form a forward boundary flush with said opposite major surface of the diaphragm.

3. An edge mounted transducer diaphragm produced by a method of combining a diaphragm and a first tubular member into a one-piece transducer diaphragm element by electron beam welding, comprising a combination the steps of:

forming said first tubular member as a first heat sink having a first end coinciding with a first peripheral region on one major surface of said diaphragm and having a wall thickness for conducting heat away from said first peripheral region axially along said first tubular member;

providing a second tubular member as a second heat sink having a second end congruent to said first end, coinciding with a second peripheral region on the opposite major surface of said diaphragm and having a wall thickness for conducting heat away from said second peripheral region axially along said second tubular member;

sandwiching said diaphragm between said first and second ends of said first and second tubular members into a composite structure laterally delimited by the peripheries of said diaphragm and said first and second tubular members;

welding said first and second ends of said first and second tubular members and a peripheral portion of said diaphragm between said first and second ends with an electron beam into a fillet-type welding joint monolithically unifying said diaphragm and first and second tubular members, by directing said electron beam radially inward onto and circumferentially along the junction between said sandwiched diaphragm and first and second tubular members;

axially removing heat from said diaphragm through said first and second heat sinks during said electron beam welding; and removing said second tubular member after completion of said electron beam welding.

4. An edge mounted transducer diaphragm produced by the method as claimed in claim 3, wherein:

said second tubular member is removed after completion of said electron beam welding so as to form a forward boundary flush with said opposite major surface of the diaphragm.

* * * * *